United States Patent
Ramaiah

(10) Patent No.: US 11,182,137 B2
(45) Date of Patent: Nov. 23, 2021

(54) TECHNIQUES FOR APPROXIMATE NEIGHBOR SELECTION IN TREE MODELS FOR COMPUTING CO-OCCURRENCE

(71) Applicant: Software AG, Darmstadt (DE)

(72) Inventor: Ramu Ramaiah, Bangalore (IN)

(73) Assignee: Software AG, Darmstadt (DE)

( * ) Notice: Subject to any disclaimer, the term of this patent is extended or adjusted under 35 U.S.C. 154(b) by 229 days.

(21) Appl. No.: 16/675,523

(22) Filed: Nov. 6, 2019

(65) Prior Publication Data

US 2021/0132921 A1    May 6, 2021

(51) Int. Cl.
  *G06F 8/41* (2018.01)
  *G06F 8/30* (2018.01)
  *G06F 8/33* (2018.01)
  *G06F 8/35* (2018.01)
  *G06F 8/34* (2018.01)

(52) U.S. Cl.
  CPC ............ *G06F 8/433* (2013.01); *G06F 8/3135* (2013.01); *G06F 8/33* (2013.01); *G06F 8/34* (2013.01); *G06F 8/35* (2013.01)

(58) Field of Classification Search
  None
  See application file for complete search history.

(56) References Cited

U.S. PATENT DOCUMENTS

2013/0268260 A1* 10/2013 Lundberg ............... G06F 40/40
                                                                704/8
2014/0100912 A1*  4/2014 Bursey ............... G06Q 30/0603
                                                              705/7.27

OTHER PUBLICATIONS

P. Albert, L. Henocque and M. Kleiner, "Configuration based workflow composition," IEEE International Conference on Web Services (ICWS'05), 2005, pp. 285-292 vol. 1. (Year: 2005).*
Kouki, Pigi, "Sharing of Semantically Enhanced Information for the Adaptive Execution of Business Processes," Apr. 8, 2013, arXiv: 1304.2326v1. (Year: 2013).*
F. Paganelli and D. Parlanti, "A Dynamic Composition and Stubless Invocation Approach for Information-Providing Services," in IEEE Transactions on Network and Service Management, vol. 10, No. 2, pp. 218-230, Jun. 2013. (Year: 2013).*

(Continued)

*Primary Examiner* — Andrew M. Lyons
(74) *Attorney, Agent, or Firm* — Nixon & Vanderhye P.C.

(57) ABSTRACT

Certain example embodiments relate to techniques for building a contextual recommendation engine. Flow representations indicating how services are to interact with one another are received. Each service represents a program logic segment. Flow representations are parsed to identify invocation and conditional processing operations therein. These identified operations are arranged in a predefined format including sequences. Each sequence corresponds to a respective flow representation and includes any identified operations in an order matching their occurrences in the respective flow representation. For each identified conditional processing operation, each identified invocation operation associated with a branch thereof is merged into a single path for inclusion in the respective sequence in place of the respective identified conditional processing operation. Each sequence is converted into a listing of atomic units. A co-occurrence model based on the listing is developed and stored to a model store so that it can be queried as integrations are built.

20 Claims, 5 Drawing Sheets

(56) References Cited

OTHER PUBLICATIONS

Smith, Fabrizio and Proiette, Maurizio, "Ontology-based Representation and Reasoning on Process Models: A Logic Programming Approach," Oct. 7, 2014, arXiv:1410.1776v1. (Year: 2014).*

R. Vaculin and K. Sycara, "Specifying and Monitoring Composite Events for Semantic Web Services," Fifth European Conference on Web Services (ECOWS'07), 2007, pp. 87-96. (Year: 2007).*

Calculating a Co-Occurrence Matrix with Hadoop, retrieved Nov. 5, 2019, 5 pages. https://dzone.com/articles/calculating-co-occurrence.

Wikipedia—WebMethods Flow, retrieved Nov. 5, 2019, 3 pages. https://en.wikipedia.org/wiki/WebMethods_Flow.

Wikipedia—WebMethods Integration Server, retrieved Nov. 5, 2019, 4 pages. https://en.wikipedia.org/wiki/WebMethods_Integration_Server.

Software AG—Integration: A Business and Technology Driver, retrieved Nov. 5, 2019, 1 page. https://www.softwareag.com/corporate/products/webmethods_integration/default.

* cited by examiner

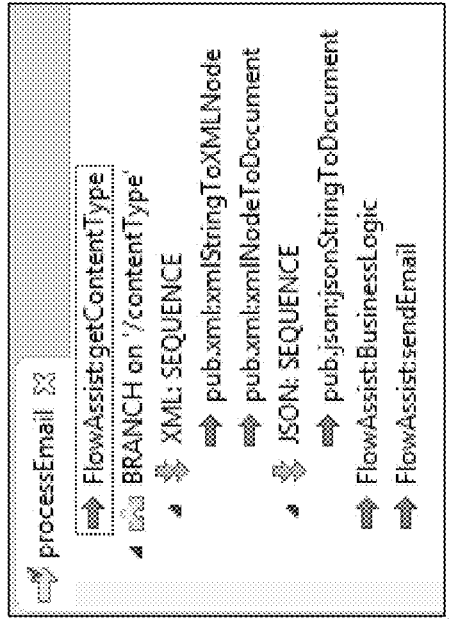
Fig. 4
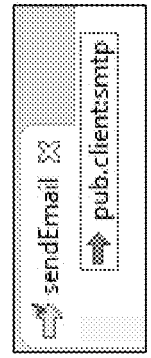
Fig. 5
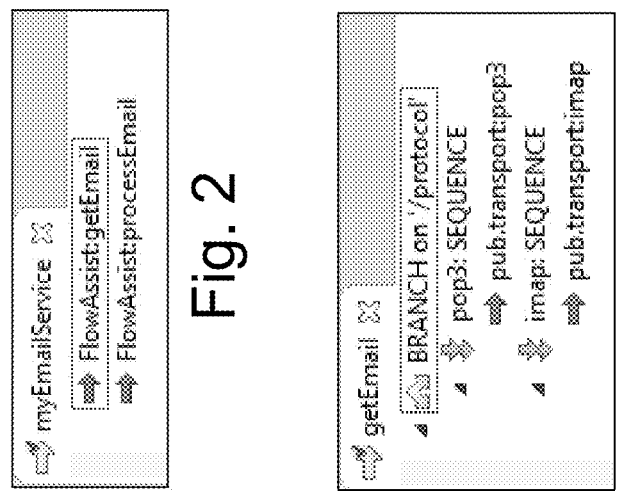
Fig. 2
Fig. 3

TECHNIQUES FOR APPROXIMATE NEIGHBOR SELECTION IN TREE MODELS FOR COMPUTING CO-OCCURRENCE

TECHNICAL FIELD

Certain example embodiments described herein relate to techniques for software tools used to integrate computer-mediated services and/or data flows. More particularly, certain example embodiments described herein relate to techniques that improve software tools that provide contextual computer code related recommendations to developers integrating disparate components in a computing environment.

BACKGROUND AND SUMMARY

Enterprise integration in general focuses on topics such as, for example, system interconnection, electronic data interchange, product data exchange, distributed computing environments, and the like. Enterprise Application Integration (EAI) frameworks help facilitate the integration of systems and applications across an enterprise. Similarly, Enterprise Data Integration (EDI) frameworks help facilitate the accession and/or movement of data residing in different sources. An organization might be interested in enterprise integration to meet challenges associated with reengineered processes, when onboarding a new group or division, etc.

Various EAI and EDI tools are commercially available and can be used to build integration logic to facilitate integrations across disparate systems, end devices, data sources/consumers, etc. Once the building blocks provided by such tools are understood, they can be used by integration developers to create complex logic to solve specific problems on behalf of the organization for which the integration is being defined.

Unfortunately, however, such tools oftentimes are designed for use by experienced integration developers. For example, in order for a developer to become productive, it typically takes quite a while to read through product documentation, understand current technical implementations and recognize technological possibilities, etc.

Thus, it will be appreciated that it would be desirable to provide a tool that facilitates EAI, EDI, and/or other integration related tasks. For instance, it will be appreciated that it would be desirable to enable the building blocks of such tools to be better and more quickly understood, e.g., so that logic can be developed more efficiently.

One aspect of certain example embodiments relates to addressing the above-described and/or other issues. For example, one aspect of certain example embodiments relates to techniques for providing contextual suggestions that facilitate the development of integration logic. That is, certain example embodiments improve tools that help build integration logic.

In certain example embodiments, a system for building a contextual recommendation engine for use in creating an integration is provided. The system includes a model store; an input interface; and processing resources including at least one processor and a memory coupled thereto. The processing resources are configured to control the system to at least: receive, over the input interface, at least one flow representation indicating how plural computer-mediated services are to interact with one another in connection with the integration, each said computer-mediated service representing a discrete program logic segment; parse each said flow representation to identify invocation and conditional processing operations therein; arrange the identified invocation and conditional operations in accordance with a predefined format, the predefined format including a plurality of sequences, each said sequence corresponding to a respective flow representation, each said sequence including any identified operations in an order matching their occurrences in the respective flow representation, wherein for each said identified conditional processing operation, each identified invocation operation associated with a branch of the respective identified conditional processing operation is merged into a single path for inclusion in the respective sequence in place of the respective identified conditional processing operation; convert each said sequence into a listing of atomic units; develop a co-occurrence model based on the listing of atomic units using a window of a predefined size; store the developed co-occurrence model to the model store; and enable the model store to be queried as integrations are being built. The system may respond to queries in certain example embodiments.

In certain example embodiments, a contextual recommendation system is provided. Processing resources include at least one processor and a memory coupled thereto and are configured to control the system to at least: present a user interface including a plurality of user-selectable representations usable in building an integration liking together disparate data sources and/or computer-mediated services to satisfy a computing objective, the representations being manipulable by the user to define the integration; in response to a user interacting with a computer-mediated service via a corresponding representation in connection with the user interface, query a contextual recommendation engine built using the system described herein (e.g., such as in the prior paragraph) to identify one or more candidate computer-mediated services with which the user might want to interact with next; highlight the one or more candidate computer-mediated services with which the user might want to interact with next; and enable the user to continue building the integration.

According to certain example embodiments, plural flow representations may be received over the input interface, e.g., with the logic sequences being ordered in accordance with how the received flow representations are linked together.

According to certain example embodiments, each sequence may be limited such that it includes only invocation operations.

According to certain example embodiments, an order of any invocation operations associated with a branch may be maintained within the single path into which they are merged.

According to certain example embodiments, a whitelist of atomic units may be maintained, with the whitelist including a predefined list of computer-mediated services such as, for example, shared services and approved publicly-available services, etc.

According to certain example embodiments, the converting may exclude from the listing any identified operations that are not present in the whitelist.

According to certain example embodiments, feedback may be provided to the recommendation engine based on whether the one or more candidate computer-mediated services with which the user might want to interact with next are interacted with next by the user.

In certain example embodiments, the co-occurrence model may be refined with input from different tenants, with input gathered during integration design, and/or the like.

In addition to the features of the previous paragraphs, counterpart methods, non-transitory computer readable storage media tangibly storing instructions for performing such methods, executable computer programs, and the like, are contemplated herein, as well. For instance, certain example embodiments may provide methods of building and/or operating a contextual recommendation engine, contextual recommendation system, and/or the like.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 2-5 are example flow services used to demonstrate how certain example techniques can work, in connection with hypothetical email processing logic;

DETAILED DESCRIPTION

Figure 1:
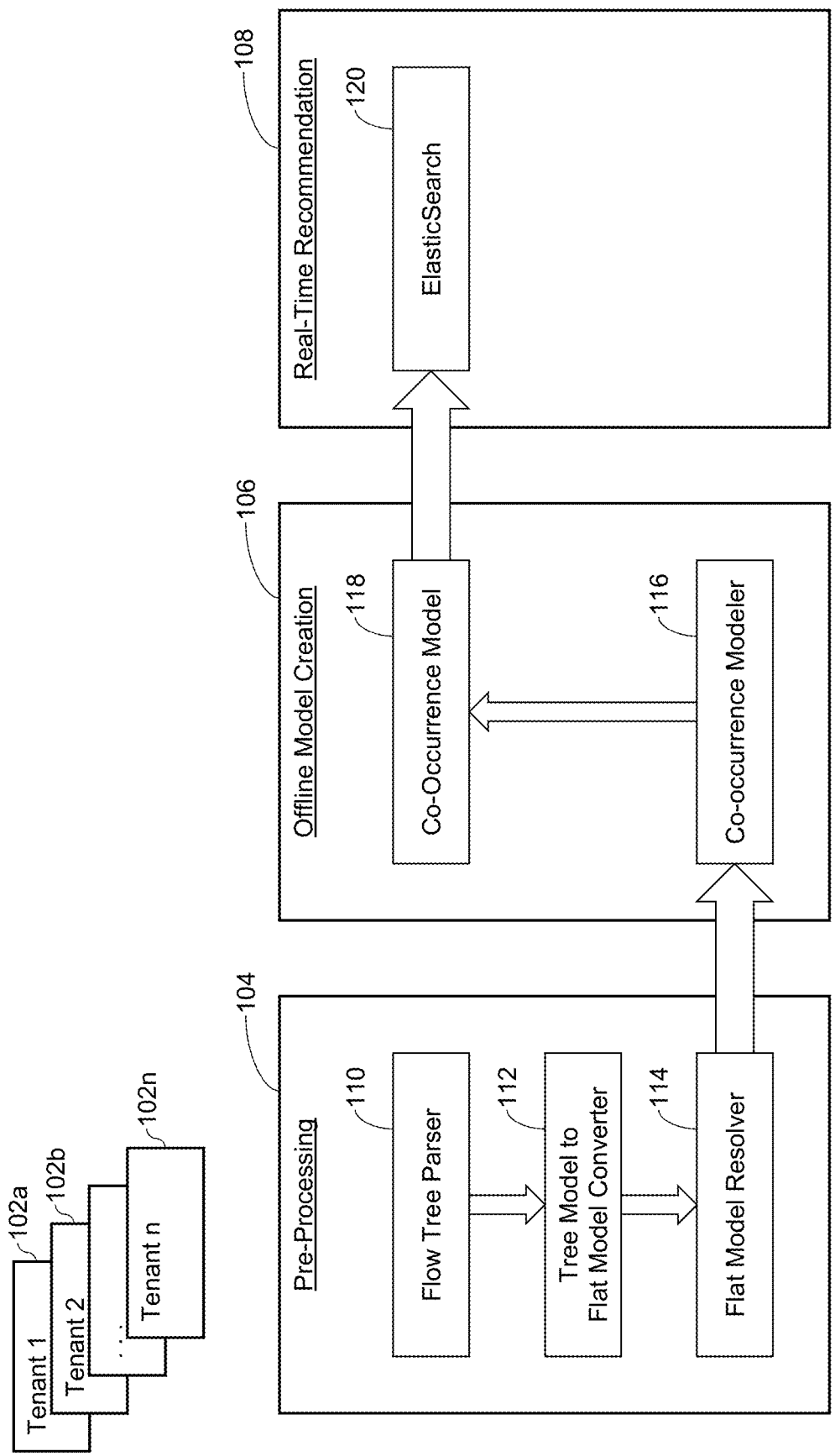
FIG. 1 is a schematic showing an end-to-end workflow for a contextual suggestion system according to certain example embodiments.

Certain example embodiments improve tools that help build integration logic, e.g., by providing contextual suggestions that facilitate the development of integration logic. Details concerning an example implementation are provided below in connection with webMethods Flow. webMethods Flow is a graphical programming language that runs within the webMethods Integration Server. webMethods Integration Server, in turn, enables integrations to be designed and implemented and thus incorporates, for example, a hardware and software framework including a designer application executable on a computing system including at least one hardware processor and a memory. Once implemented, the integration can be enabled and distributed to system components as appropriate (e.g., local and/or remote servers tasked with implementing services, applications, and/or the like). webMethods Flow simplifies tedious, difficult-to-maintain, and/or otherwise error prone aspects of integration activities. It will be appreciated that this example implementation is provided to help demonstrate concepts of certain example embodiments, and aspects thereof are non-limiting in nature unless specifically claimed. For example, descriptions concerning example services, functions, component configurations, etc., are non-limiting in nature unless specifically claimed.

To write Flow programs, the developer has to know the basic building blocks (including the basic services) provided by the Integration Server and its layered products. The services may be, for example, web services or other bundles of executable program logic callable via application programming interface (API) calls which may in some instances be RESTful, Remote Procedure Calls (RPCs), and/or the like. Knowing how to use these building blocks, in turn, involves understanding which services can be used, and under what contexts they can be used, e.g., to solve a computing problem associated with the integration.

Consider, for example, a situation in which a user must write logic for processing an email. Assume that in this example situation:

1. The email message can come from a pop3 and/or imap transport. This would implicate the "pub.transport:pop3" and "pub.transportimap" building block services, respectively.
2. The content type of the email can be one of XML or JSON. Regardless of type received over the transport, the email payload has to be converted to an Integration Server document type for graphical mapping and/or further processing. For example, the services "pub.xml:xmlStringToXMLNode" and "pub.xml:xmlNodeToDocument" can be used to convert the payload to an appropriate document type, if the content type is XML. On the other hand, the service "pub.json:jsonStringToDocument" can be used to convert the payload to an appropriate document type, if the content type is JSON.
3. Logic is triggered with the mapped document.
4. After the completion of logic, an email acknowledgement is sent with the help of the service "pub.client:http".

With respect to the third item listed above, an experienced developer would know that, after calling the service "pub.xml:xmlStringToXMLNode", the service "pub.xml:xmlNodeToDocument" should be called. Doing so would convert the content in the initially received email received over the transport, first from a string to an XML node, and then from the XML node into a document appropriate for further processing, e.g., to enable the mapping facility provided by the Integration Server to be run on the ultimate document (which would in turn enable the appropriate logic to be identified and executed). For a novice, this need to process these two particular services in this particular order may not be readily known. A novice user might, for example, have to navigate through a graphical user interface (GUI) or other listing of the services available in Integration Server and, at the same time, consult the documentation to understand how to develop the logic. As those skilled in the art know, it typically takes some time for novice developers to gain experience in how to use the Integration Server and Flow tools such that building blocks can be readily identified and orchestrated to accomplish a particular goal.

To improve existing tools, certain example embodiments provide a recommendation engine. As many people have experienced, Amazon's ecommerce recommendation engine can provide consumers with recommendations of complementary and/or complimentary items that the consumers might not have known about, e.g., when those consumers are browsing, select an item for purchase, etc. In the ecommerce context, this functionality can be helpful in exposing consumers to products that they did not necessarily know about beforehand, and can present items that would go well with and/or substitute for a particular selection.

In a similar vein, existing integration tools can be improved to make developers more productive and/or efficient. For example, when a developer selects the service "pub.xml:xmlStringToXMLNode", it would be desirable to recommend the service "pub.xml:xmlNodeToDocument". Certain example embodiments therefore provide recommendations as to complementary and/or complimentary building blocks that may be useful to a developer, e.g., in response to the developer selecting one or more building blocks when constructing a flow or integration. There are many different types of recommendation algorithms available. Many work by mining the similarities between the entities upon which they operate. Certain example embodiments make use of the co-occurrence algorithm, as described in greater detail below.

As many organizations transition to offering at least some of their services via the cloud, many of the building blocks also are offered from the cloud. Thus, when building an integration as a Software as a Service (Saas) platform or the like, logic developed by multiple tenants can be made available for use therein. With the wealth of data available in the cloud, the logic developed by the individual tenants can be mined to look for interesting patterns. In a sense, then, the recommendation engine is powered by Big Data. The data of interest in this context typically is unstructured. Conventional database tools, statistical tools (such as the R programming language), etc., generally cannot handle such significant volumes of data and thus generally cannot provide workable recommendation engines.

Certain example embodiments implement Apache Hadoop and Apache Spark environments to facilitate the recommendation engines, thereby enabling terabytes and even petabytes worth of unstructured data to be processed in some scenarios. With this technical backbone, data concerning cloud-based deployments can be gathered in single- and multi-tenant environments (and even across multiple enterprises, in certain example embodiments), and interesting patterns in cloud-based deployments can be revealed. This information can, in turn, be used for providing contextual suggestions or recommendations to integration developers, thereby improving the productivity of the developers by creating "smarter" tools that, in a sense, develop integration logic or program code "on their own" that be checked by developers designing an integration.

FIG. 1 is a schematic showing an end-to-end workflow for a contextual suggestion system according to certain example embodiments. Tenants 102a-102n provide data that may be used to develop the corpus of information enabling recommendations to be made and/or are involved in the creation of new integrations. Data provided can be stored to a non-volatile data store 104 and processed as described below. The tenants 102a-102n may operate their own respective computing environments and thus may operate computer systems including processing resources comprising processors, memories, network interfaces, etc.

The FIG. 1 workflow includes pre-processing phase operations 104, offline model creation phase operations 106, and real-time recommendation phase operations 108. Each of these phases will be discussed in detail below.

Example Pre-Processing Phase Operations

The pre-processing phase operations 104 make use of a flow tree parser module 110, a tree model to flat model converter module 112, and a flat model resolver module 114. Each of these modules may be implemented as software running on a computing system (e.g., in a cloud-based environment) including at least one processor and a memory.

Example Flow Tree Parser Module Related Operations

Flow code, or flow syntax, facilitates graphical configuration of the mapping logic that typically forms the major part of integration projects, as transformation and conversion of data in a text-based programming language quickly becomes unwieldy and cluttered and difficult to maintain. Flow code in essence is developed as if source and destination data formats, services, and/or the like were placed side-by-side on a white board and lines were used to connect a source to a destination (e.g., with many-to-many relationships being supported). Flow code facilitates a service-based view of an application or other integration product, as any existing code can be treated as if it were a service and invocation functionality can treat it as if it were a black box requiring certain inputs and providing certain outputs mapped from available variables.

More particularly, webMethods Flow supports a variety of operators or constructs potentially relevant to an integration, including:

1. Map: Map documents from one format to another. For example, a developer can map a document in an XML format to an ebXML format or a proprietary format.
2. Invoke: Invoke any service for which the caller of the current flow has access rights on the integration server.
3. Branch: The "Branch" operation allows a developer to conditionally execute an operation based on the value of a variable at runtime. For example, a "Branch" operation could be used to process a repair request one way if the FaultType value indicates "CONNECTION_UNEXPECTEDLY_TERMINATED" and another way if it indicates "DISK_FAILURE".
4. Loop: The "Loop" operation repeats a sequence of child operations once for each element in an array that is developer-specified. For example, if the "pipeline" (the means by which to pass data to and get results back from invocation of services) includes an array of repair request line items, a developer could use a "Loop" operation to process each line item in the array.
5. Repeat: The "Repeat" operation allows a developer to conditionally repeat a sequence of child operations based on the success or failure of those operations.
6. Exit: The "Exit" operation allows a developer to exit the entire flow service or a single flow operation.
7. Sequence: A developer can use the "Sequence" operation to build a set of operations to be treated as a group. Operations in a group are executed in order, one after another. By default, all operations in a flow service, except for children of a "Branch" operation, are executed as though they were members of an implicit "Sequence" operation.
8. TRY-CATCH-FINALLY: A construct for exception handling much like the support provided by languages like Java, Python, etc.

The flow tree parser module 110 is interested in Invoke operations and, in a way, those operations that can involve Invoke operations (e.g., to the extent that they can involve groupings of Invoke operations). The latter includes Branch, Loop, Repeat, Sequence, and TRY-CATCH-FINALLY operations. Here, Branch operations also are of special interest, insofar as they can dictate the path through a flow that is taken. In other words, the flow runtime is taken based on the Invoke operations taken based on Branch conditions. Thus, the flow tree parser module 110 of certain example embodiments identifies at least Invoke and Branch operations. In certain example embodiments, the above-listed and/or other operations may be identified and handled, as well, e.g., as will be appreciated from the description below. For instance, Sequence operations can be helpful in the parsing and recognition as they in a way serve as containers for Invoke operations, Loop and Repeat operations can provide valuable contextual information, and TRY-CATCH-FINALLY operations can also trigger a type of conditional invocation. It will be appreciated that Invoke operations are of interest because, out of the eight Flow constructs described above, the Invoke construct is the only construct that can, in itself, call other flow services. It thus may be thought of as being a subroutine calling another subroutine and thus may be helpful in providing a user with a contextual suggestion as to what might be a good candidate for subsequent "Invoke" operation(s).

Example Tree Model to Flat Model Module Related Operations

Working with example scenario above, hypothetical email processing logic can be defined as follows. First, the service "myEmailService" retrieves the email from one of the transports, i.e., the pop3 or imap transport. Second, the email processing logic processes the email based on the content type. As stated above, the content type can be either XML or JSON. Third, the email content is transformed to an Integration Server understandable document type before the logic is invoked based on the content of the original email message. Fourth, an email acknowledgement is sent after the completion of the logic, with the help of the service pub.client:smtp.

FIGS. 2-5 are example flow services that may be used in this regard. More particularly, FIG. 2 is an example "myEmailService" flow service. It calls the "getEmail" flow service and then the "processEmail" flow service. FIG. 3 is an example "getEmail" flow service, which may be called by the FIG. 2 example "myEmailService" flow service. In the FIG. 3 example, there is a Branch operation set up based on the transport protocol. If the transport protocol used is pop3, then the pub.transport:pop3 service is invoked. If the transport protocol used is imap, then the pub.transport:imap service is invoked.

FIG. 4 is an example "processEmail" flow service," which may be called from the "myEmailService" flow service. In the FIG. 4 example, the getContentType service is invoked to determine the type of content in the payload of the email retrieved. The Branch operation causes different processing based on the content type. The first Sequence operation indicates that, if the content type is XML as indicated in the first Branch option, then the "pub.xml:xmlStringToXMLNode" and "pub.xml:xmlNodeToDocument" services should be called, in that order. The second Sequence operation indicates that, if the content type is JSON as indicated in the second Branch option, then the "pub.json:jsonStringToDocument" service should be called. The logic is invoked on the converted document, and the "sendEmail" service ultimately is called. FIG. 5 is an example "sendEmail" flow service that may be called in this regard. This flow service simply sends an email using the service pub.client:smtp, as indicated above.

Figure 6:
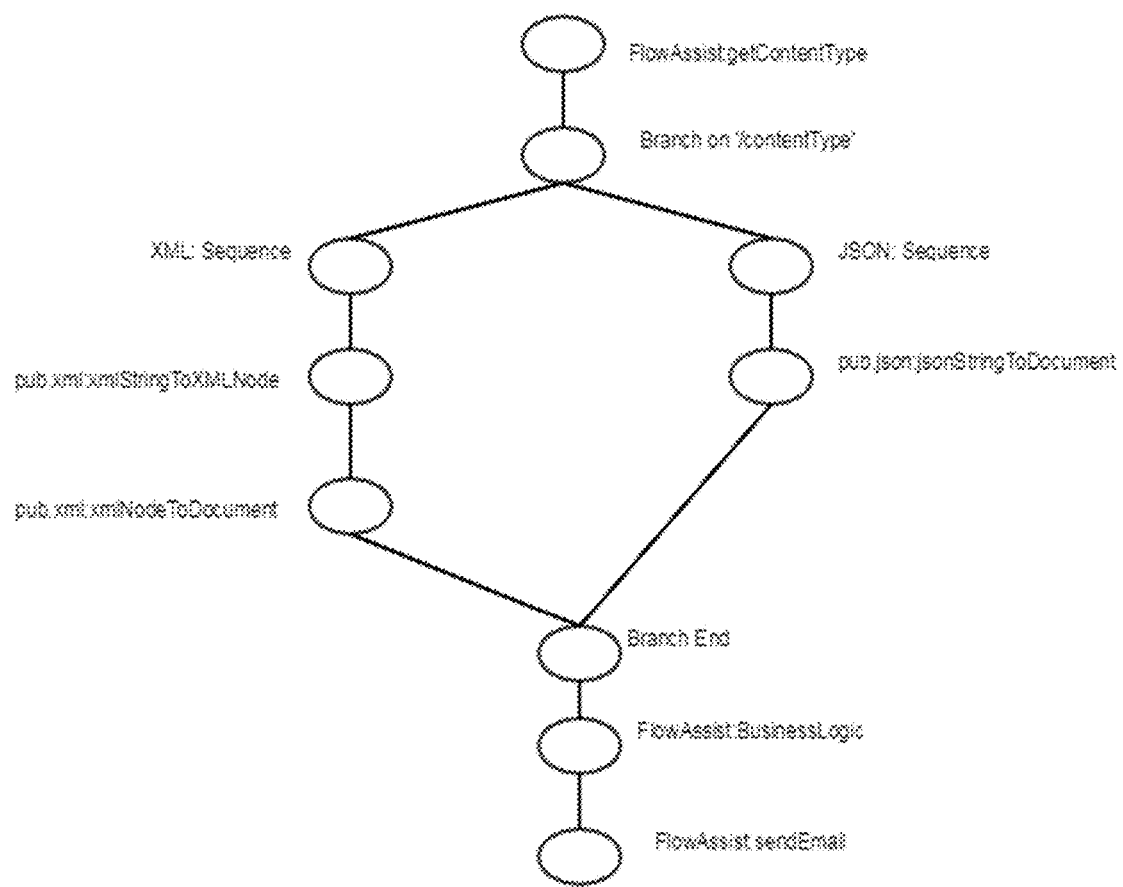
FIG. 6 is a tree structure that corresponds to the FIG. 4 "processEmail" flow service.

Each of the hierarchical flow services can be represented by trees, showing the services that can be invoked, and the branches that can be taken. Sequence information can also be represented in such tree diagrams by following "in-line" paths. For example, FIG. 6 is a tree structure that corresponds to the FIG. 4 "processEmail" flow service. FIG. 6 is semantically equivalent to the FIG. 4 hierarchical flow service view and thus matches the description above.

A flow service representation can be converted into a tree representation, e.g., by traversing the flow service using a depth-first search (DFS) or breadth-first-search (BFS) strategy. Each Invoke operation and each Branch operation can be represented as a node in a tree. As shown in the FIG. 6 example, an end of a Branch can have its own node representation, as well.

A tree model can be difficult to work with (e.g., machine learning languages can be designed for, or readily adapted to work with, flat models, whereas they typically are not designed to work with tree models or the like) and, therefore, certain example embodiments construct a flat model from the tree model using the tree model to flat model converter 112 taking into account the possible branches. Conversion of the tree model to a flat model can involve a representation of the latter that follows the following basic format: <name of the parent service> <child1 service> <child2 service> . . . .

Tags or other markers can be added to the flat model representation to represent possible branches from a parent service. For instance, a parent service name can be appended with a "$count" marker to represent the possible branches the parent service can take during run time. It will be appreciated that multiple tags or markers may be added to a given representation, e.g., if there are multiple branches that can be taken.

The FIG. 6 tree model representing the example email processing logic can be converted to a flat model in this way. Taking into account the branches, the following flat model representation may be derived:

```
FlowAssist:myEmailService FlowAssist:getEmail
    FlowAssist:processEmail
FlowAssist:getEmail$1 pub.transport:pop3
FlowAssist:getEmail$2 pub.transport:imap
FlowAssist:processEmail$1 FlowAssist:getContentType
    pub.xml:xmlStringToXMLNode pub.xml:xmlNodeToDocument
    FlowAssist:BusinessLogic FlowAssist:sendEmail
FlowAssist:processEmail$2 FlowAssist:getContentType
    pub.json:jsonStringToDocument FlowAssist:BusinessLogic
    FlowAssist:sendEmail
FlowAssist:sendEmail pub.client:smtp
```

Example Flat Model Resolver Module Related Operations

Once the flat model is developed, the flat model resolver module 114 helps break the complex flow services to simpler parts (e.g., atomic units), and maintains a whitelist of services that correspond with three simpler parts. To use a natural language processing (NLP) or machine learning analogy, this may be thought of as being the "vocabulary."

To understand why complex services are converted to atomic unis, consider the developer-written complex flow service "FlowAssist:processEmail", which is serialized as follows:

```
FlowAssist:processEmail FlowAssist:getContentType
    pub.xml:xmlStringToXMLNode pub.xml:xmlNodeToDocument
    pub.json:jsonStringToDocument FlowAssist:BusinessLogic
    FlowAssist:sendEmail
```

This serialized representation follows the processEmail flow service, without indicating any branches.

This serialized representation could be written by a "Tenant A" developer, for example. However, the implementation is likely to be very specific for that tenant. It therefore may not make much sense to other tenants. That said, the inventor has observed that complex services are built by developers using the basic building blocks provided by the product "Out-Of-The-Box" (OOTB). The basic building blocks thus may be considered the atomic units. By breaking down complex units into atomic units, it is representable in a "language" common for all tenants. Thus, implementation differences that are reflected in complex units may give way to a common format representation by referencing atomic units.

Atomic units are ones that cannot (or should not) be broken down further. Thus, some or all of the following and/or other options may be deemed atomic units: (1) All OOTB or "primitive" services exposed by the Integration Server, and all layered products; (2) all publicly available "recipes"; and (3) all services shared by one tenant's developers with other developers in other tenants, with the former's consent. With respect to (1), it is noted that Integration Server is designed as a base platform, on top of which one or more "layered products" can be run. Layered products in this sense may include, for example, Trading Networks (a module that connects with external B2B partners), E-Standards (a module that supports various standards/document exchange formats like EDI, HIPPA, SWIFT, etc.), and/or the like. With respect to (2), it is noted that Integration Server ships with some of "recipes" that can be helpful for users, either "as is" or with some modification. Recipes can make use of publicly-available services in some instances. Example recipes may include, for example, instructions for how an XML file can be converted to an Integration Server document for better mapping, instructions for how one can create a simple RESTful or SOAP based web service, etc. With respect to (3), it is noted that the cloud roadmap of the Integration Server has a plan, wherein one user in tenant A can create reusable complex logic and can share it with other tenants. This is like a "marketplace" or exchange for complex reusable services that can be used in a plug-and-play fashion. Advantageously, flow developers would not necessarily have to redesign approaches that are already available.

Following the example above, the following may be given as input to the flat model resolver module 114:

```
FlowAssist:myEmailService FlowAssist:getEmail
  FlowAssist:processEmail
FlowAssist:getEmail$1 pub.transport:pop3
FlowAssist:getEmail$2 pub.transport:imap
FlowAssist:processEmail$1 FlowAssist:getContentType
  pub.xml:xmlStringToXMLNode pub.xml:xmlNodeToDocument
  FlowAssist:BusinessLogic FlowAssist:sendEmail
FlowAssist:processEmail$2 FlowAssist:getContentType
  pub.json:jsonStringToDocument FlowAssist:BusinessLogic
  FlowAssist:sendEmail
FlowAssist:sendEmail pub.client:smtp
```

An algorithm for complex service resolution with branch handling is as follows:
1. Perform a DFS (or the like) to resolve/expand the composite services to their atomic units. Reaching an atomic unit triggers the termination of the recursion.
2. When a referenced service is not found in the whitelist of atomic units, the referenced service likely is not an atomic unit and, thus, an attempt should be made to further resolve/expand it. The reference service has appended thereto $counter, and it is resolved/expanded. The counter starts from 1 and ends with the number of branches that the parent service had.
3. Check for cycles during the DFS traversal, e.g., using standard graph theory approaches for cycle detection.
4. Filter for the top level services, i.e., the services that do not have a parent and thus are "root services."

A top level service is an entry point into the system. For example, for an order processing system, what the customer would see is a service named "placeOrder". Internally, this service can call many services or subroutines to get the job done. In that regard, to place an order, this service may have to call many internal services such as, for example, "checkInventory", "checkCreditWorthiness", etc. Filtering for the top level service can be important because doing so can provide one complete path. For example, for a bus travelling from New York to Washington D.C., en route destinations may include Philadelphia and Baltimore. Routes including these destinations without also including the start and stop locations would be only part of the complete path. The sub-paths thus would reflect only part of the main path/routes. By considering top level services, however, all sub-paths may be considered.

Figure 7:
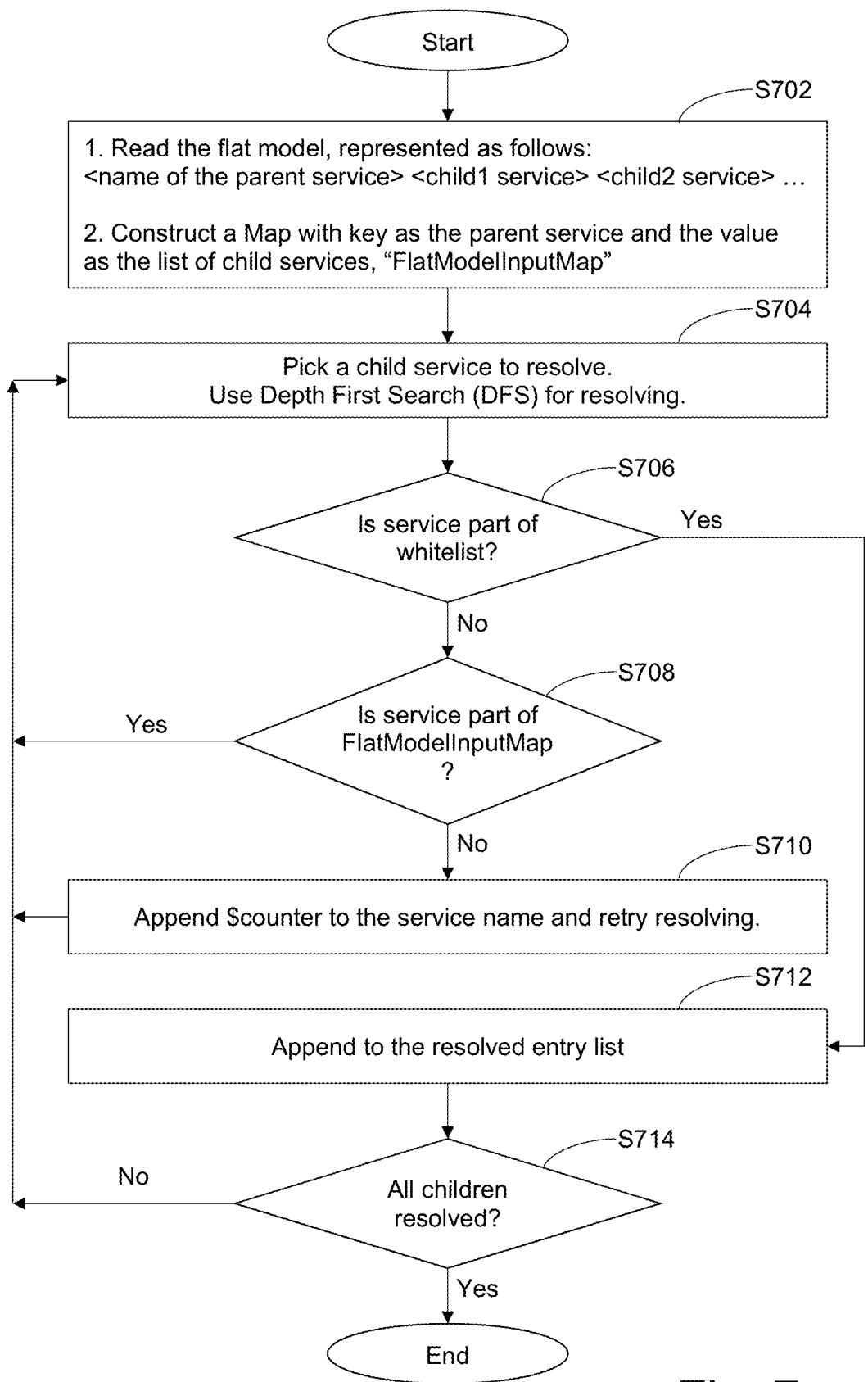
FIG. 7 is a flowchart showing a complex service resolution approach that handles branching, which may be used in accordance with certain example embodiments.

FIG. 7 is a flowchart showing a complex service resolution approach that handles branching, which may be used in accordance with certain example embodiments. In step S702, the flat model is read and a map is constructed. The flat model may be represented as <name of the parent service> <child1 service> <child2 service> . . . . The map may be structured to include key-value pairs in certain example embodiments. For instance, the key may be the service, and the value may be the list of child services. The map may be named, e.g., "FlatModelInputMap." In step S704, a child service is selected for resolution, and a DFS is used in this regard in certain example embodiments. In step S706, a determination is made as to whether the service in quest is a part of the whitelist. If so, then it is appended to a resolved entry list in step S712; otherwise, a determination is made as to whether the service is a part of the map (in this example, the "FlatModelInputMap" construct) in step S708. If so, then a recursive loop is triggered, and the process returns to step S704. If not, then a counter (e.g., in the form "$counter" or the like) is appended to the service name, and a resolution process is retried, in step S710. A determination is made in step S714 as to whether all children of the service in question have been resolved. If so, the process is ended; otherwise, the process returns to step S704 for further processing.

The following is the output of the flat model resolver module 114 implementing the algorithmic approach described above, taking into account branches:

```
FlowAssist:myEmailService pub.transport:pop3
  pub.xml:xmlStringToXMLNode pub.xml:xmlNodeToDocument
  pub.client:smtp
FlowAssist:myEmailService pub.transport:pop3
  pub.json:jsonStringToDocument pub.client:smtp
FlowAssist:myEmailService pub.transport:imap
  pub.xml:xmlStringToXMLNode pub.xml:xmlNodeToDocument
  pub.client:smtp
FlowAssist:myEmailService pub.transport:imap
  pub.json:jsonStringToDocument pub.client:smtp
```

Example Modifications for Pre-Processing Phase Operations

It will be appreciated that the number of combinations exponentially increases with respect to the complex services that lie beneath the branches. Serializing all of the complex services beneath the branches can be very "computationally expensive" in terms of computing cycles and/or processing power, and require a large amount of time. Thus, it may not always be feasible to create a fully accurate and fully complete listing of paths, e.g., when the tree is deeply nested. Certain example embodiments therefore implement an approximate neighbor selection algorithm to reduce complexity when converting the tree model to the flat model.

The tree model to flat model converter module 112 thus may appropriate in an "approximate" mode in certain example embodiments. In this approximate mode, the entire path will not be built out in the same way as above. Instead, in certain example embodiments, when the flow tree is parsed, whenever the converter module 112 encounters a Branch operation, the parent element will list all possible children paths. All of the children of the Branch operation are collected and stored as one single sequence. This in effect merges all of the possible paths into one single path. In certain example embodiments, collection can be stopped, for example, when all the children of the Branch operation are merged into one single path.

Figure 8:
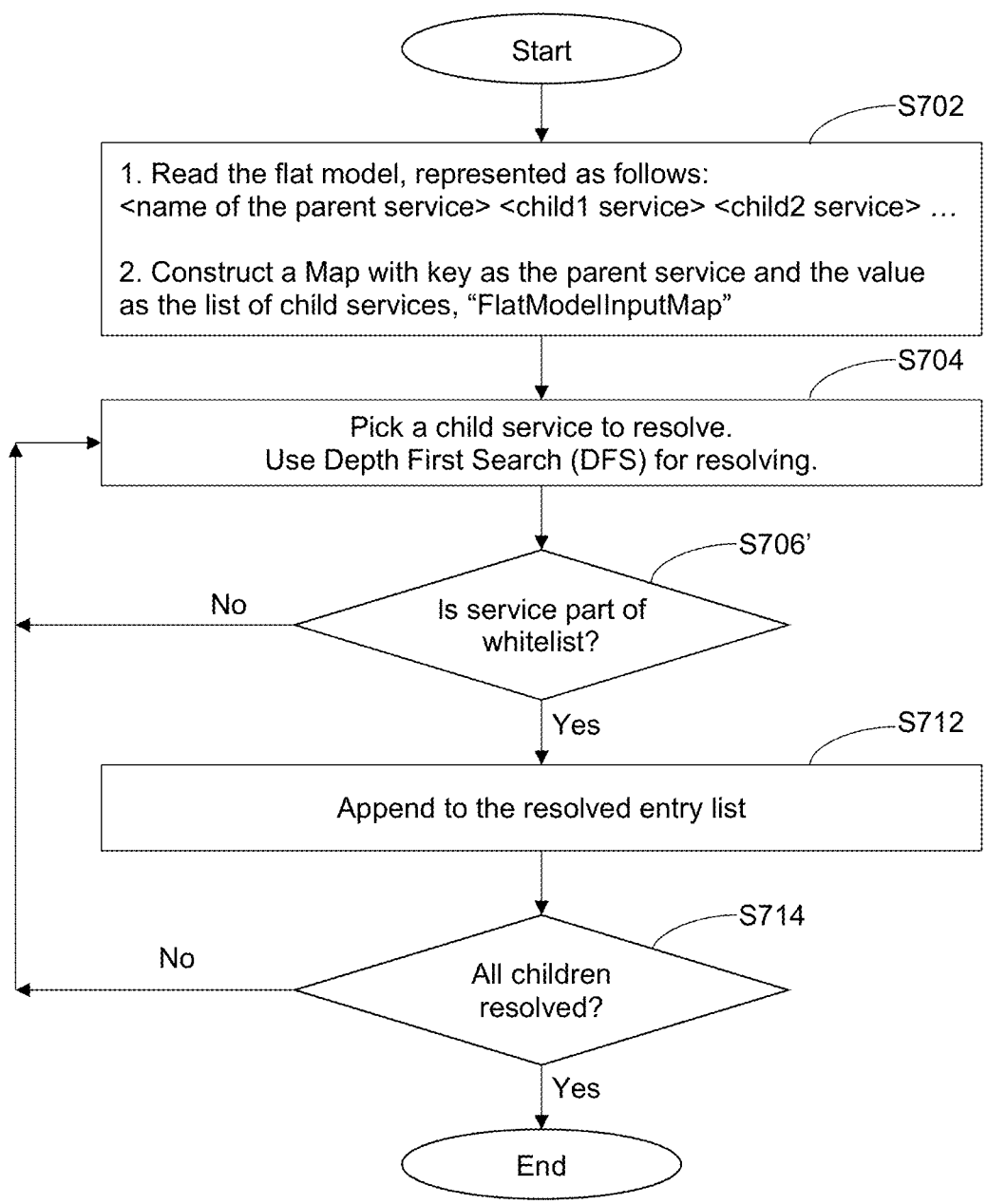
FIG. 8 is a flowchart showing an approach for converting a tree model into a flat model without fully taking into account branching, in accordance with certain example embodiments.

FIG. 8 is a flowchart showing an approach for converting a tree model into a flat model without fully taking into account branching, in accordance with certain example embodiments. FIG. 8 is similar to FIG. 7, except that steps S708-S710 are absent, as branching is not fully taken into account. Thus, in FIG. 8, the determination in step S706' operates differently. That is, if the service is part of the whitelist, then the process continues to step S712 where it is appended to the resolved entry list; otherwise, the process more directly returns to step S704.

In this example, this merging is performed only for Branch operations, as they are the only statement that conditionally alter the sequence of invocation operations. In other example embodiments, this approach may be taken for other operations that trigger conditional operations.

Without fully taking branches into account, and instead using this approximation approach, the example email processing logic would be captured as follows:

```
FlowAssist:myEmailService FlowAssist:getEmail
    FlowAssist:processEmail
FlowAssist:getEmail pub.transport:pop3 pub.transport:imap
FlowAssist:processEmail FlowAssist:getContentType
    pub.xml:xmlStringToXMLNode pub.xml:xmlNodeToDocument
    pub.json:jsonStringToDocument FlowAssist:BusinessLogic
    FlowAssist:sendEmail
FlowAssist:sendEmail pub.client:smtp
```

Here, it can be seen that branch on protocol is collapsed or merged, such that the parent element of the branch statement (the getEmail flow service itself) lists both the pub.transport:pop3 and pub.transport:imap services. Similarly, the branch on content type in the processEmail flow service collapses or merges into the parent FlowAssist:getContentType element (which already follows its parent processEmail flow service) at least the pub.xml:xmlStringToXMLNode, pub.xml:xmlNodeToDocument, and pub.json:jsonStringToDocument services.

Contrasting the outputs when branches are and are not fully taken into account shows a simplification in the number of statements considered, even for this simple scenario.

This simplified flat model may be provided to the flat model resolver 114 that operates in the same or similar manner provided above. That is, the approach shown and described above in connection with FIG. 7 may be used on this simplified flat model that does not fully take into account branches. In this way, a common or more general purpose flat model resolver 114 can be configured to handle input that was generated to process branches in a fully and complete manner and input that was not. The following, simplified output will be produced by the flat model resolver 114:

```
FlowAssist:myEmailService pub.transport:pop3 pub.transport:imap
    pub.xml:xmlStringToXMLNode pub.xml:xmlNodeToDocument
    pub.json:jsonStringToDocument pub.client:smtp
```

With this approach, during the model conversion (where the tree model is converted to the flat model by the converter module 112) and during resolution (using the flat model resolver module 114), the flow is read as a flat model without the branches being fully considered. When the branches are included, the time complexity exponentially increases when all possible paths are "walked." Using the simplified approach can help greatly reduce the time complexity and/or amount of processing power needed.

One trade-off of this decision is that it may not be possible to accurately and/or deterministically convert the flow model to a flat model. For example, the service "pub.json:jsonStringToDocument" may succeed the service "pub.xml:xmlNodeToDocument" which would not be necessary or appropriate. That said, combining this data with data from other integrations from this tenant and with data from other tenants, etc., will help compensate for the inaccuracy, e.g., by the time recommendations are to be developed.

In this regard, it can be observed that not every tenant will write code such that the last entry of the branch will have the operation "pub.xml:xmlNodeToDocument" and the first entry of the next branch will have the operation "pub.json:jsonStringToDocument", which otherwise would signal them as successors as part of the approximate neighbor selection. If two operations have a natural successor relationship, there is a good chance that they will co-occur even when branches are not fully considered. By contrast, if two operations do not have a natural successor relationship, there is a good chance that the consideration of multiple implementations across multiple integrations (with or without the inclusion of multiple tenants) will reflect this fact. The co-occurrence algorithmic approach set forth in detail below can make use of this information as the data corpus grows and thus still become accurate over time, e.g., as more data sources are considered, etc.

Example Offline Model Creation Phase Operations

The offline model creation phase 106 includes a module that receives as input data from the pre-processing phase 104 and produces a model to be used in the improved tool of certain example embodiments. As those skilled in the art will appreciate, there are many algorithmic approaches available in the data mining and text mining fields that may be used in this regard. The FIG. 1 example includes a co-occurrence modeler unit 116 creating a co-occurrence model 118. The co-occurrence approach is a statistical technique that works in connection with a Continuous Bags of Words (CBOW).

Detecting a co-occurrence could be described as involving the tracking of an event and, given a certain window of time or space, determining what other events seem to occur. In certain example embodiments, "events" are the individual words and/or atomic units found in the text, and the other words and/or atomic units that occur within the "window" will be tracked. The "window" in certain example embodiments may be thought of as being a position relative to the target word and thus may have a spatial component. For example, consider the phrase, "The quick brown fox jumped over the lazy dog". With a window value of 2, the co-occurrence for the word "jumped" would be [brown, fox, over, the]. A similar co-occurrence matrix could be applied to other areas that require investigation into when "this" event occurs, what other events seem to happen at the same time, etc.

The output from the flat model resolver 114 is fed to the co-occurrence modeler 116. The simplified output from the flat model resolver 114 that does not fully take into account branches is used as the input in certain example embodiments. As described below, in certain example embodiments, the co-occurrence algorithm takes only the children of the parent, and the parent service name is not included as the input.

Sample output from the co-occurrence modeler 116 run on a sample data set produced the entries below. In the output, a word or atomic unit is identified, followed by a neighbor tag or marker and an indication of the neighboring word or atomic unit, followed again by an occurrence count. Here, the window size is 2 to indicate word pairs and near-word pairs, although other window sizes can be used in different example embodiments. In general a window size less than 5, more preferably less than 3 is desirable to reduce the risk of erroneous occurrences and given the recognition that order of service invocation quite often matters. Having a smaller window also reduces the amount of data to be processed on the backend, e.g., when searching for a recommendation.

```
word= [pub.xml:xmlStringToXMLNode]neighbor= [pub.xml:xml-
   NodeToDocument],250
word= [pub.xml:xmlStringToXMLNode]neighbor= [pub.xml:query-
   XMLNode],14
word= [pub.xml:xmlStringToXMLNode]neighbor= [pub.xml:getXML-
   NodeIterator],9
```

The neighbors for an atomic unit or service are sorted based on the count and can be represented in a table or other data structure, e.g., as follows:

| Service Name | Neighbor | Count |
| --- | --- | --- |
| pub.xml:xmlStringToXMLNode | pub.xml:xmlNodeToDocument | 250 |
| pub.xml:xmlStringToXMLNode | pub.xml:queryXMLNode | 14 |
| pub.xml:xmlStringToXMLNode | pub.xml:getXMLNodeIterator | 9 |

The table in essence represents the model 118 in certain example embodiments. It can be consulted to perform contextual recommendations. It is observed that the results converge when it is provided with more and more data. That is, it is observed that the accuracy of the recommendation improves as more and more data is provided.

An example implementation may implement the co-occurrence algorithm using the MapReduce programming paradigm in Apache Hadoop. Other example implementations may be configured differently. The Code Appendix included herewith includes an example Spark/Scala Program that may be used to implement the co-occurrence approach of certain example embodiments.

Example Real-Time Recommendation Phase Operations

The real-time recommendation phase 108 works with the co-occurrence model 118 created during the offline model creation phase 106. For instance, batched jobs provided to the co-occurrence modeler 116 may be used to produce the model 118 that can be loaded to a data store for real-time queries used for performing contextual suggestions, e.g., as integration flows are developed. The data store itself could be provided on-premises or in a cloud-based or other remote store. With respect to the former, a client computing system running software for designing flows can connect to a local store when and as needed to perform contextual suggestions. With respect to the latter, ElasticSearch 120 or the like can be used to facilitate a cloud-based implementation. As a variation, a local server or the like can connect to the cloud environment and download the output of the data processing batch job (the model 118) and store the results either in its local storage or in-memory. That local server then can be queried by a designer tool operating on a local client computing system.

In certain example embodiments, as a developer is designing a flow in a GUI-based designer tool (e.g., software running on a local computing system), contextual suggestions may be provided by consulting the co-occurrence model 118. The GUI may include, for example, user-selectable services presented in a list or the like. The user-selectable services may be arrangeable in a designer canvas or the like, such that inputs and outputs can be used to connect together different services to compose program logic at a service level, e.g., as if one were drawing out a process and connecting data, computational, and/or other elements on a whiteboard. When a developer selects a given service, the co-occurrence model 118 may be consulted to try to determine whether it is likely that a specific service should be implemented in a sequence thereafter (e.g., immediately thereafter). For instance, one or more candidate services may be visually highlighted to prompt user selection, and/or automatically placed in the designer with a provisional marker or the like, e.g., if the likelihood of a match exceeds a predetermined threshold, a count is above a predefined limit, and/or the like. Similarly, if the developer begins identifying a service, one or more candidates may be presented for user-selection, e.g., based on a combination of the preceding service disposed and the textual input.

Once the integration is complete and committed, a representation thereof may be fed back to the system of FIG. 1, e.g., so that the model can be refined over time.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

CODE APPENDIX

1. The "Cooccur.scala" program logic may include the following:

```
package com.softwareag.esb.tools.cooccur
import scala.collection.mutable.ListBuffer
import org.apache.spark.SparkContext
```

CODE APPENDIX

```
import org.apache.spark.rdd.RDD
/**
 * An implementation of co-occurrence algorithm in Spark/Scala
 */
class Cooccur extends Serializable {
  def cooccur (sc: SparkContext, entries: RDD[String], optionMap:
Map[Symbol, String]): RDD[ScoredWordPair] = {
    val serviceEntry =
entries.map (Service.apply).filter(_.hasChildrens)
    val neighbors: Int = optionMap.getOrElse('neighbors, "1").toInt
    val wordPairs = serviceEntry.flatMap ((service: Service) =>
(convertToWordPair (service, neighbors).toList))
    val minCount: Int = optionMap.getOrElse('minCount,"1").toInt
    val wordPairCount = wordPairs
      .map((wordPair: WordPair) => (wordPair, 1))
      .reduceByKey((x: Int, y: Int) => x + y)
      .filter((z: Tuple2[WordPair, Int]) => (z._2 > minCount))
    val cooccurGroupbyKey = wordPairCount
      .map((x: Tuple2[WordPair, Int]) => new ScoredWordPair(x._1,
x._2))
      .groupBy((scoredWordPair: ScoredWordPair) =>
scoredWordPair.wordPair.word)
    val cooccur = cooccurGroupbyKey.mapValues((x:
Iterable[ScoredWordPair]) => x.toList).values
    val cooccurSorted = cooccur
      .flatMap(list => list.sortBy(_.score) (Ordering[Int].reverse))
    cooccurSorted
  }
  def convertToWordPair(service: Service, neighbors:Int):
ListBuffer[WordPair] = {
    val wordPairs:ListBuffer[WordPair] = new ListBuffer[WordPair] ()
    val childrens = service.getChildrens
    for (i <- 0 until childrens.length) {
      var start = if (i - neighbors < 0) 0 else i - neighbors;
      var end = if (i + neighbors >= childrens.length)
childrens.length - 1 else i + neighbors;
      for (j <- start to end) {
        if (j != i) {
          wordPairs.+= (new WordPair(childrens(i), childrens(j)))
        }
      }
    }
    wordPairs
  }
}
```

2. The "Driver.scala" program logic may include the following:

```
package com.softwareag.esb.tools.cooccur
import org.apache.spark.{SparkConf, SparkContext}
import scala.language.existentials
object Driver {
  type OptionMap = Map [Symbol, String]
  val usage: String =
    """
      |Usage: FlowAssist -n <neighbors> -m <minCount> input output
    """.stripMargin
  def main(args: Array[String]): Unit = {
    if (args.length < 4) {
      println("Dunno: " + args.toList + "\n" + usage)
      sys.exit(-1)
    }
    val argsList = args.toList
    val optionMap = parseOptions(argsList)
    val conf = new SparkConf()
      .setAppName("FlowAssist")
      .set("spark.hadoop.validateOutputSpecs", "false") //overwrite output directory
    val sc = new SparkContext(conf)
    //pass the containing jar to the spark context
    SparkContext.jarOfClass(this.getClass)
    val entries = sc.textFile(optionMap('input))
    val cooccur = new Cooccur().cooccur(sc, entries, optionMap)
    cooccur.saveAsTextFile(optionMap('output))
    sc.stop()
  }
  def parseOptions(argsList: List[String]): OptionMap = {
    def nextOption(map: OptionMap, list: List[String]): OptionMap =
    {
      list match {
        case Nil => map
        case "-n" :: value :: tail => nextOption(map ++
Map('neighbors -> value.toString), tail)
        case "-m" :: value :: tail => nextOption(map ++
Map('minCount -> value.toString), tail)
        case string :: opt2 :: tail => nextOption(map ++ Map('input
-> string, 'output -> opt2), tail)
        case option :: tail => throw new RuntimeException("Unknown
option " + option)
      }
    }
    nextOption(Map(), argsList)
  }
}
```

3. The "ScoredWordPair.scala" program logic may include the following:

```
package com.softwareag.esb.tools.cooccur
/**
 * A scored word pair for sorting the neighbors based on the count
 */
case class ScoredWordPair(val wordPair: WordPair, val score: Int) {
  override def toString: String = wordPair.toString + "," + score
}
```

4. The "Service.scala" program logic may include the following:

```
package com.softwareag.esb.tools.cooccur
/**
 * A representation of a flattened service. For e.g. see the below
example
 * FlowAssist:myEmailService pub.transport:pop3 pub.transport:imap
pub.xml:xmlStringToXMLNode pub.xml:xmlNodeToDocument
pub.json:jsonStringToDocument pub.client:smtp
 * The above is represented as follows
 * <parent service name> <children 1> <children 2> . . .
 */
case class Service(val entry: String) {
  def hasChildrens: Boolean = {
    val tokens = entry.toString.split("\\s+")
    tokens.length > 1
  }
  def getChildrens: Array[String] = {
    val entries = entry.toString.split("\\s+")
    var childrens:Array[String] = null
    if(entries.length > 1) {
      childrens = new Array[String] (entries.length-1)
      childrens = entries.splitAt(1) ._2
    } else {
      childrens = new Array[String] (0)
    }
    childrens
  }
}
```

5. The "WordPair.scala" program logic may include the following:

```
package com.softwareag.esb.tools.cooccur
/**
 * A word pair for co-occurrence algorithm
 * A word pair is a tuple of <word, neighbor>
 */
case class WordPair(val word: String, val neighbor: String) {
  override def toString: String = "word= [" + word + "]" +
"neighbor= [" + neighbor + "]"
}
```

What is claimed is:

1. A system for building a contextual recommendation engine for use in creating an integration, comprising:
   a model store;
   an input interface; and processing resources including at least one processor and a memory coupled thereto, the processing resources being configured to control the system to at least:

receive, over the input interface, at least one flow representation indicating how plural computer-mediated services are to interact with one another in connection with the integration, each said computer-mediated service representing a discrete program logic segment;

parse each said flow representation to identify invocation and conditional processing operations therein;

arrange the identified invocation and conditional operations in accordance with a predefined format, the predefined format including a plurality of sequences, each said sequence corresponding to a respective flow representation, each said sequence including any identified operations in an order matching their occurrences in the respective flow representation, wherein for each said identified conditional processing operation, each identified invocation operation associated with a branch of the respective identified conditional processing operation is merged into a single path for inclusion in the respective sequence in place of the respective identified conditional processing operation;

convert each said sequence into a listing of atomic units;

develop a co-occurrence model based on the listing of atomic units using a window of a predefined size;

store the developed co-occurrence model to the model store; and enable the model store to be queried as integrations are being built.

2. The system of claim 1, wherein plural flow representations are received over the input interface, the logic sequences being ordered in accordance with how the received flow representations are linked together.

3. The system of claim 1, wherein each sequence includes only invocation operations.

4. The system of claim 1, wherein an order of any invocation operations associated with a branch is maintained within the single path into which they are merged.

5. The system of claim 1, wherein a whitelist of atomic units is maintained, the whitelist including a predefined list of computer-mediated services.

6. The system of claim 5, wherein the whitelist further includes shared services and approved publicly-available services.

7. The system of claim 5, wherein the converting includes excluding from the listing any identified operations that are not present in the whitelist.

8. The system of claim 1, wherein the window size is 2 atomic units.

9. A contextual recommendation system, comprising:

processing resources including at least one processor and a memory coupled thereto, the processing resources being configured to control the system to at least:

present a user interface including a plurality of user-selectable representations usable in building an integration liking together disparate data sources and/or computer-mediated services to satisfy a computing objective, the representations being manipulable by the user to define the integration;

in response to a user interacting with a computer-mediated service via a corresponding representation in connection with the user interface, query a contextual recommendation engine built using the system of claim 1 to identify one or more candidate computer-mediated services with which the user might want to interact with next;

highlight the one or more candidate computer-mediated services with which the user might want to interact with next; and enable the user to continue building the integration.

10. The system of claim 9, wherein the processing resources are further configured to control the system to at least provide feedback to the recommendation engine based on whether the one or more candidate computer-mediated services with which the user might want to interact with next are interacted with next by the user.

11. A method for building a contextual recommendation engine for use in creating an integration, the method comprising:

receiving at least one flow representation indicating how plural computer-mediated services are to interact with one another in connection with the integration, each said computer-mediated service representing a discrete program logic segment;

parsing each said flow representation to identify invocation and conditional processing operations therein;

arranging the identified invocation and conditional operations in accordance with a predefined format, the predefined format including a plurality of sequences, each said sequence corresponding to a respective flow representation, each said sequence including any identified operations in an order matching their occurrences in the respective flow representation, wherein for each said identified conditional processing operation, each identified invocation operation associated with a branch of the respective identified conditional processing operation is merged into a single path for inclusion in the respective sequence in place of the respective identified conditional processing operation;

converting each said sequence into a listing of atomic units;

developing a co-occurrence model based on the listing of atomic units using a window of a predefined size;

storing the developed co-occurrence model to a model store; and enabling the model store to be queried as integrations are being built.

12. The method of claim 11, wherein plural flow representations are received, the logic sequences being ordered in accordance with how the received flow representations are linked together.

13. The method of claim 11, wherein each sequence includes only invocation operations.

14. The method of claim 11, wherein an order of any invocation operations associated with a branch is maintained within the single path into which they are merged.

15. The method of claim 11, further comprising maintaining a whitelist of atomic units is maintained, the whitelist including a predefined list of computer-mediated services and/or approved services.

16. The method of claim 15, further comprising excluding from the listing any identified operations that are not present in the whitelist.

17. The method of claim 11, wherein the window size is 2 atomic units.

18. The method of claim 11, further comprising refining the co-occurrence model with input from different tenants.

19. The method of claim 11, further comprising refining the co-occurrence model with input gathered during integration design.

20. A non-transitory computer readable storage medium including instructions that, when executed by a hardware processor of a computing system facilitate creation of a contextual recommendation engine for use with integration design, by at least:

receiving at least one flow representation indicating how plural computer-mediated services are to interact with one another in connection with the integration, each said computer-mediated service representing a discrete program logic segment;

parsing each said flow representation to identify invocation and conditional processing operations therein;

arranging the identified invocation and conditional operations in accordance with a predefined format, the predefined format including a plurality of sequences, each said sequence corresponding to a respective flow representation, each said sequence including any identified operations in an order matching their occurrences in the respective flow representation, wherein for each said identified conditional processing operation, each identified invocation operation associated with a branch of the respective identified conditional processing operation is merged into a single path for inclusion in the respective sequence in place of the respective identified conditional processing operation;

converting each said sequence into a listing of atomic units;

developing a co-occurrence model based on the listing of atomic units using a window of a predefined size;

storing the developed co-occurrence model to a model store; and enabling the model store to be queried as integrations are being built.

\* \* \* \* \*